United States Patent
Byun

(10) Patent No.: US 11,144,246 B2
(45) Date of Patent: Oct. 12, 2021

(54) MEMORY SYSTEM USING AVAILABLE BAD BLOCK BASED ON DATA STORAGE RELIABILITY AND OPERATING METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/670,562

(22) Filed: Oct. 31, 2019

(65) Prior Publication Data

US 2020/0310691 A1 Oct. 1, 2020

(30) Foreign Application Priority Data

Mar. 28, 2019 (KR) .................. 10-2019-0035970

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0631* (2013.01); *G06F 3/0679* (2013.01)
(58) Field of Classification Search
CPC .... G06F 3/0659; G06F 3/0604; G06F 3/0679; G06F 3/064; G06F 3/0631; G06F 2212/1016; G06F 2212/7208; G06F 2212/1032; G06F 2212/7205; G06F 3/0649; G06F 3/061; G06F 12/0246; G06F 3/0614
USPC .................. 711/103, 162; 714/4.11; 365/200
See application file for complete search history.

(56) References Cited

U.S. PATENT DOCUMENTS

| | | | | |
|---|---|---|---|---|
| 9,430,339 | B1* | 8/2016 | Song | G11C 16/3495 |
| 2007/0089031 | A1* | 4/2007 | Huffman | G06F 11/1012 |
| | | | | 714/763 |
| 2012/0124277 | A1* | 5/2012 | Danilak | G06F 3/0679 |
| | | | | 711/103 |
| 2013/0326116 | A1* | 12/2013 | Goss | G06F 12/0871 |
| | | | | 711/103 |
| 2015/0206584 | A1* | 7/2015 | Tsai | G11C 29/42 |
| | | | | 711/103 |
| 2016/0283117 | A1* | 9/2016 | Zhang | G11C 16/349 |
| 2019/0304562 | A1* | 10/2019 | Cai | G06F 3/064 |

FOREIGN PATENT DOCUMENTS

| | | |
|---|---|---|
| KR | 1020130069364 | 6/2013 |
| KR | 101460240 | 11/2014 |
| KR | 101829861 | 2/2018 |

* cited by examiner

*Primary Examiner* — Hong C Kim
(74) *Attorney, Agent, or Firm* — IP & T Group LLP

(57) ABSTRACT

A memory system includes a nonvolatile memory device including a plurality of memory blocks and a controller configured to control the nonvolatile memory device. The controller determines, as an available bad block, a memory block having data storage reliability equal to or greater than a first reference value, included in the plurality of memory blocks, determines write data to be stored in the nonvolatile memory device as first data which is required for the memory system to normally operate or second data which does not correspond to the first data, and allocate the write data determined as the second data to the available bad block. The nonvolatile memory device performs a write operation of storing the second data in the available bad block.

15 Claims, 7 Drawing Sheets

MEMORY SYSTEM USING AVAILABLE BAD BLOCK BASED ON DATA STORAGE RELIABILITY AND OPERATING METHOD THEREOF

CROSS-REFERENCES TO RELATED APPLICATION

The present application claims priority under 35 U.S.C. § 119(a) to Korean application number 10-2019-0035970, filed on Mar. 28, 2019, which is incorporated herein by reference in its entirety.

BACKGROUND

1. Technical Field

Various embodiments generally relate to a semiconductor apparatus, and more particularly, to a memory system and an operating method thereof.

2. Related Art

Recently, the paradigm for the computing environment has changed to the ubiquitous computing environment in which computer systems can be used anytime and anywhere. Therefore, the use of portable electronic devices such as a mobile phone, digital camera and notebook computer has rapidly increased. Such a portable electronic device generally uses a memory system using a memory device. The memory system is used to store data used in the portable electronic device.

Since the memory system using a memory device has no mechanical driver, the data storage device has excellent stability and durability, exhibits high information access speed, and has low power consumption. Examples of the memory system having such advantages include a universal serial bus (USB) memory device, a memory card having various interfaces, a universal flash storage (UFS) device, and a solid state drive (SSD).

SUMMARY

Various embodiments are directed to a technique capable of improving data processing performance of a memory system.

In an embodiment, a memory system may include: a nonvolatile memory device including a plurality of memory blocks; and a controller configured to control the nonvolatile memory device. The controller may determine, as an available bad block, a memory block having data storage reliability equal to or greater than a first reference value, included in the plurality of memory blocks, determine write data to be stored in the nonvolatile memory device as first data which is required for the memory system to normally operate or second data which does not correspond to the first data, and allocate the write data determined as the second data to the available bad block. The nonvolatile memory device may perform a write operation of storing the second data in the available bad block.

In an embodiment, there is provided an operating method of a memory system which includes a nonvolatile memory device including a plurality of memory blocks and a controller configured to control the nonvolatile memory device. The operating method may include the steps of: determining, by the controller, as an available bad block, a memory block having data storage reliability equal to or greater than a first reference value, included in the plurality of memory blocks; determining, by the controller, write data to be stored in the nonvolatile memory device as any one of first data which is required for the memory system to normally operate and second data which does not correspond to the first data; allocating, by the controller, the write data determined as the second data to the available bad block; and performing, by the nonvolatile memory device, a write operation of storing the write data determined as the second data in the available bad block.

In an embodiment, a memory system may include: a nonvolatile memory device including a plurality of memory blocks, configured to perform a write operation on the plurality of memory blocks; and a controller configured to determine each memory block as any one of a normal block, an available bad block and an unavailable bad block according to a write/erase count of a corresponding memory block, determine an attribute of write data to be stored in the nonvolatile memory device, and allocate the available bad block to the write data determined as copied data or recovery data when the write operation is performed.

DETAILED DESCRIPTION

Figure 1:
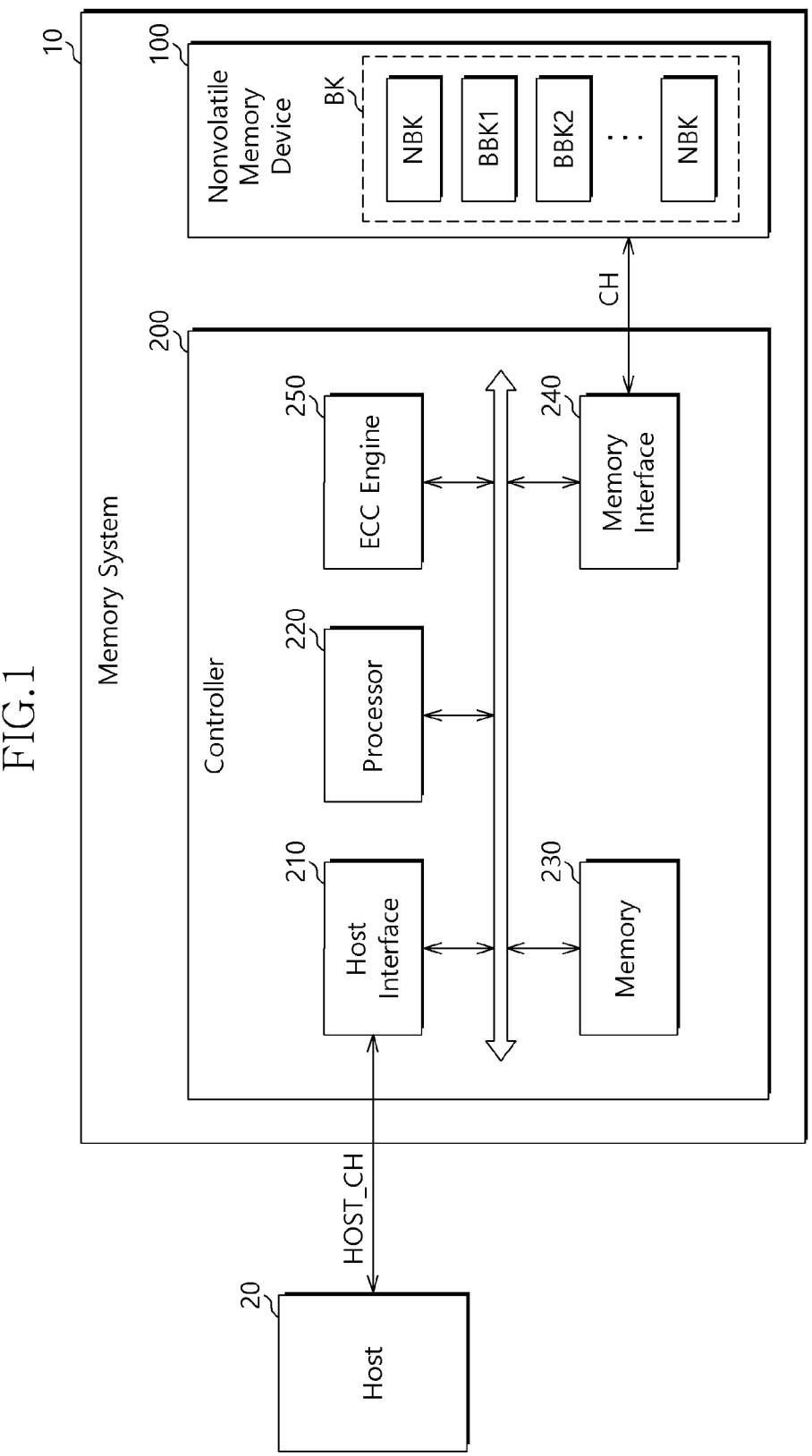
FIG. 1 is a diagram illustrating a memory system in accordance with an embodiment of the present invention.

The advantages and characteristics of the present disclosure and a method for achieving the advantages and characteristics will be described through the following embodiments with reference to the accompanying drawings. However, the present disclosure is not limited to the embodiments described herein, but may be embodied in different manners. The present embodiments are only provided to describe the present disclosure in detail, such that the technical idea of the present disclosure can be easily carried out by those skilled in the art to which the present disclosure pertains.

Throughout the specification, when a certain element is "coupled" to another element, it may not only indicate that the former element is "directly coupled to" the latter element, but also indicate that the former element is "indirectly coupled to" the latter element with another element interposed therebetween. In this specification, when an element "includes or comprises" a component, it may indicate that the element does not exclude another component unless referred to the contrary, but can further include or comprise another component.

Hereafter, embodiments will be described in detail with reference to the accompanying drawings. The same components in the accompanying drawings will be represented by like reference numerals. Moreover, detailed descriptions related to well-known functions or configurations will be omitted in order not to unnecessarily obscure subject matters of the present embodiment.

FIG. 1 is a diagram illustrating a memory system 10 in accordance with an embodiment of the present invention.

Referring to FIG. 1, the memory system 10 may store data accessed by a host 20 such as a mobile phone, MP3 player, laptop computer, desktop computer, game machine, TV or in-vehicle infotainment system. The memory system 10 may be coupled to the host 20 through a host channel HOST_CH.

The memory system 10 may form various types of storage devices depending on an interface protocol coupled to the host 20. For example, the memory system 10 may be configured as any one of various types of storage devices which include an SSD (Solid State Drive), an MMC (Multi-Media Card), an eMMC, RS-MMC, micro-MMC, an SD (Secure Digital) card, a mini-SD, micro-SD card, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card and a memory stick.

The memory system 10 may be implemented as any one of various types of packages such as a POP (Package-On-Package), an SIP (System-In-Package), an SOC (System-On-Chip), an MCP (Multi-Chip Package), a COB (Chip-On-Board), a WFP (Wafer-Level Fabricated Package) and a WSP (Wafer-Level Stack Package).

The memory system 10 may include a nonvolatile memory device 100 and a controller 200.

The nonvolatile memory device 100 may operate as a storage medium of the memory system 10. The nonvolatile memory device 100 may be configured as any one of various types of nonvolatile memory devices such as a NAND flash memory device, a NOR flash memory device, an FRAM (Ferroelectric Random Access Memory) using a ferroelectric capacitor, an MRAM (Magnetic Random Access Memory) using a TMR (Tunneling Magneto-Resistive) layer, a PRAM (Phase Change Random Access Memory) using chalcogenide alloys, and an ReRAM (Resistive Random Access Memory) using transition metal oxide, depending on the types of memory cells.

FIG. 1 illustrates that the memory system 10 includes one nonvolatile memory device 100. However, this is only for convenience of description, and the memory system 10 may include a plurality of nonvolatile memory devices.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks BK, and each of the memory blocks BK may include a plurality of data pages. A plurality of memory blocks BK may include at least one normal block NBK, at least one available bad block BBK1, and at least one unavailable bad block BBK2.

For example, each of the memory cells included in the memory cell array may be configured as a single level cell (SLC) capable of storing 1-bit data or a multi-level cell (MLC) capable of storing 2 or more-bit data. The MLC may store 2-bit data, 3-bit data, 4-bit data or the like. In general, a memory cell capable of storing 2-bit data may be referred to as an MLC, a memory cell capable of storing 3-bit data may be referred to as a triple level cell (TLC), and a memory cell capable of storing 4-bit data may be referred to as a quad level cell (QLC). In the present embodiment, however, the memory cells capable of storing 2-bit to 4-bit data will be collectively referred to as MLCs, for convenience of description.

In an embodiment, plural data pages may form one data page group. For example, when a data page group includes a plurality of memory cells each capable of storing N bits, the data page group may include N data pages. That is, when each of the memory cells included in the data page group is an MLC capable of storing two bits, the data page group may include the LSB (Least Significant Bit) page and the MSB (Most Significant Bit) page. Furthermore, when each of the memory cells included in the data page group is a TLC capable of storing three bits, the data page group may include the LSB page, a CSB (Center Significant Bit) page and the MSB page.

The memory cell array may include one or more of the SLC and the MLC. Furthermore, the memory cell array may include memory cells with a two-dimensional (horizontal) structure or memory cells with a three-dimensional (vertical) structure.

The controller 200 may control overall operations of the memory system 10 by driving firmware or software loaded to a memory 230 included therein. The controller 200 may decode and drive a code-based instruction or algorithm such as firmware or software. The controller 200 may be implemented in hardware or a combination of hardware and software.

The controller 200 may include a host interface 210, a processor 220, a memory interface 240, an ECC (Error Correction Code) engine, and the memory 230.

The host interface 210 may interface the memory system 10 with the host 20 depending on a protocol of the host 20. For example, the host interface 210 may communicate with the host 20 using any one protocol of an SD (secure digital), a USB (Universal Serial Bus), an MMC (Multi-Media Card), an eMMC (Embedded MMC), a PCMCIA (Personal Computer Memory Card International Association), a PATA (Parallel Advanced Technology Attachment), an SATA (Serial Advanced Technology Attachment), an SCSI (Small Computer System Interface), an SAS (Serial Attached SCSI), a PCI (Peripheral Component Interconnection), a PCI-E (PCI Express) and a UFS (Universal Flash Storage). The host interface 210 may perform a disk emulation function of supporting the host 20 to recognize an SSD as a general-purpose memory system, for example, a hard disk drive (HDD).

The processor 220 may include a micro control unit (MCU) and a central processing unit (CPU). The processor 220 may process a request transferred from the host 20. In order to process the request transferred from the host 20, the processor 220 may drive a code-based instruction or algorithm loaded to the memory 230, i.e. firmware, and control the nonvolatile memory device 100 and internal function blocks such as the host interface 210, the memory 230 and the memory interface 240.

The processor 220 may generate control signals to control an operation of the nonvolatile memory device 100 based on requests transferred from the host 20, and provide the generated control signals to the nonvolatile memory device 100 through the memory interface 240. The processor 220 may analyze and process a signal SGL inputted from the host 20. The processor 220 may control operations of the internal function blocks according to firmware or software for driving the memory system 10.

The memory 230 may be configured as a RAM (Random Access Memory), and disposed inside or outside the controller 200. The memory 230 may store the firmware driven by the processor 220. The memory 230 may store the firmware driven by the processor 220. Furthermore, the memory 230 may store data required for driving the firmware, i.e., metadata. That is, the memory 230 may serve as a working memory of the processor 220. Furthermore, the memory 230 may include a data buffer for temporarily storing write data which are to be transferred from the host 20 to the nonvolatile memory device 100 or read data which are to be transferred from the nonvolatile memory device 100 to the host 20. That is, the memory 230 may serve as a buffer memory.

The memory interface 240 may control the nonvolatile memory device 100 under control of the processor 220. The memory interface 240 may also be referred to as a memory controller. The memory interface 240 may provide control signals to the nonvolatile memory device 100 through a channel CH. The control signals may include a command, an address and an operation control signal for controlling the nonvolatile memory device 100. The memory interface 240 may provide data stored in the data buffer to the nonvolatile memory device 100 or store data transferred from the nonvolatile memory device 100 in the data buffer.

The ECC engine 250 may generate parity data by performing ECC encoding on write data provided from the host 20. The nonvolatile memory device 100 may store write data with the parity data. Furthermore, the ECC engine 250 may generate read data from which the parity data is removed, by performing ECC decoding on data read from the nonvolatile memory device 100, using the parity data.

Figure 2:
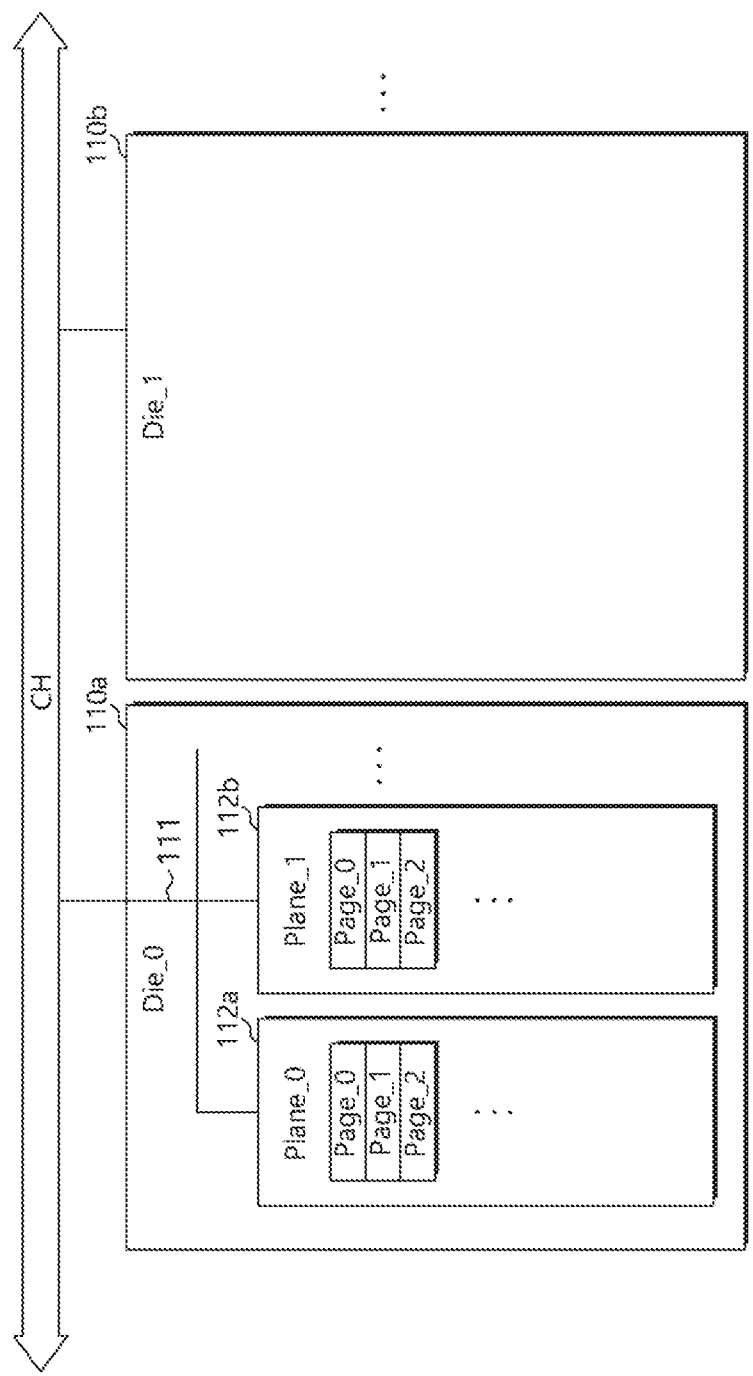
FIG. 2 is a diagram describing a data storage region included in a nonvolatile memory device shown in FIG. 1.

FIG. 2 is a diagram describing a data storage region included in the nonvolatile memory device 100 shown in FIG. 1.

Referring to FIG. 2, the nonvolatile memory device 100 may include a plurality of dies (e.g., Die_0 110a and Die_1 110b) which share the channel CH coupled to the controller 200, each of the dies may include a plurality of planes (e.g., Plane_1 112a and Plane_1 112b) which share a way 111 coupled to the channel CH, and each of the planes may include a plurality of data pages (e.g., Page_0, Page_1, and Page_2). The data page may indicate a storage region corresponding to the minimum unit for reading or writing data. Furthermore, a plurality of data pages which are collectively erased may be referred to as a block, and a plurality of blocks which are disposed on different planes and managed as one block may be referred to as a super block. Therefore, the data storage region in the nonvolatile memory device 100 may indicate a die, a plane, a super block, a block, a data page or the like. In the following descriptions, however, the data storage region may indicate a data page unless stated otherwise.

Figure 3:
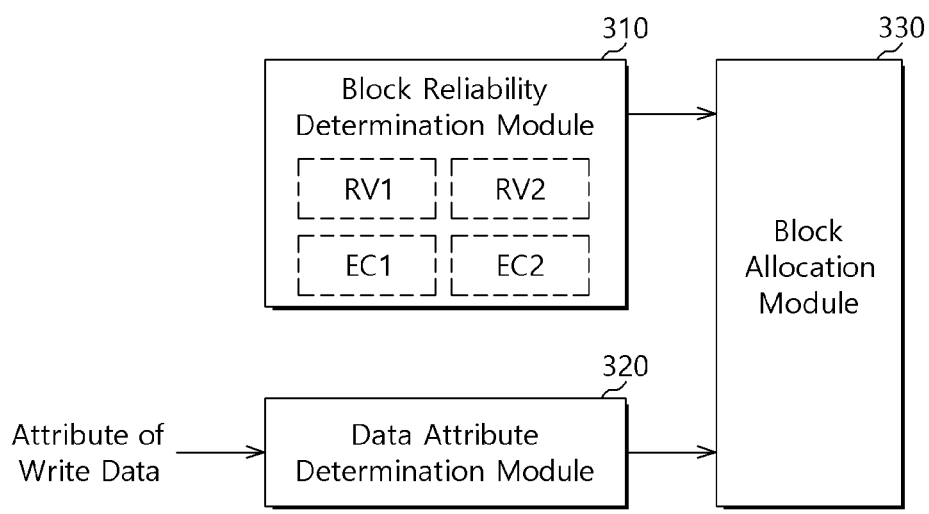
FIG. 3 is a diagram describing a flash translation layer (FTL) in accordance with an embodiment of the present invention.

FIG. 3 is a diagram describing an example of a flash translation layer (FTL) in accordance with an embodiment of the present invention.

Referring to FIG. 3, the FTL may include a block reliability determination module 310, a data attribute determination module 320 and a block allocation module 330, in order to efficiently allocate memory blocks BK of memory system 10. The FTL may be included in the processor 220 of the controller 200.

The block reliability determination module 310 may determine each of a plurality of memory blocks BK included in the nonvolatile memory device 100 as a normal block NBK or a bad block, according to data storage reliability indicating how stably a corresponding memory block can store data, and determine a memory block determined as a bad block as an available bad block BBK1 or an unavailable bad block BBK2. The data storage reliability may be decided according to a first reference value RV1 and a second reference value RV2 indicating the number of write/erase operations on a corresponding memory block. That is, the available bad block BBK1 may indicate a bad block which can store data, but cannot guarantee the data storage reliability.

In an embodiment, the block reliability determination module 310 may determine, as an available bad block BBK1, a memory block having data storage reliability equal to or more than the first reference value RV1, among the memory blocks determined as bad blocks. The data storage reliability equal to or more than the first reference value RV1 may indicate that the number write/erase operations is less than a first write/erase count EC1. The first reference value RV1 may be preset or varied at the fabrication or use step of the memory system 10.

In an embodiment, the block reliability determination module 310 may determine, as a normal block NBK, a memory block having data storage reliability equal to or greater than the second reference value RV2, among the plurality of memory blocks BK included in the nonvolatile memory device 100, and determine, as a bad block, a memory block having data storage reliability less than the second reference value RV2. The data storage reliability less than the second reference value RV2 may indicate that the number of write/erase operations is greater than a second write/erase count EC2. The second reference value RV2 may be larger than the first write/erase count EC1.

The data attribute determination module 320 may determine write data to be stored in the nonvolatile memory device 100 as first data or second data, depending on the attribute of the write data.

In an embodiment, the first data may indicate data which are necessarily required for the memory system 10 to normally operate. For example, the first data may include user data, map data and the like.

In an embodiment, the second data may indicate data other than the first data among data to be stored in the nonvolatile memory device 100, that is, data through which the memory system 10 can normally operate, even though a loss occurs after the data are stored in the nonvolatile memory device 100. For example, the second data may include copied data or recovery data which are provided against a loss or error of the first data.

Furthermore, the first data and the second data may be preset at the design stage of the memory system 10, and also may be varied at the user stage.

The block allocation module 330 may allocate a memory block in which write data is to be stored, among the plurality of memory blocks BK included in the nonvolatile memory device 100.

In an embodiment, the block allocation module 330 may allocate a memory block determined as a normal block NBK to write data determined as the first data. This is in order to stably store the first data which is necessarily required for the memory system 10 to normally operate.

In an embodiment, the block allocation module 330 may allocate a memory block, determined as an available bad block BBK1 among the memory blocks determined as bad blocks, to write data determined as the second data. This is in order to efficiently manage the memory blocks by using a memory block having a certain degree of data storage reliability among the memory blocks determined as bad blocks, to store data which may have a slight influence on a normal operation of the memory system 10 even though a loss occurs in the data.

Figure 4:
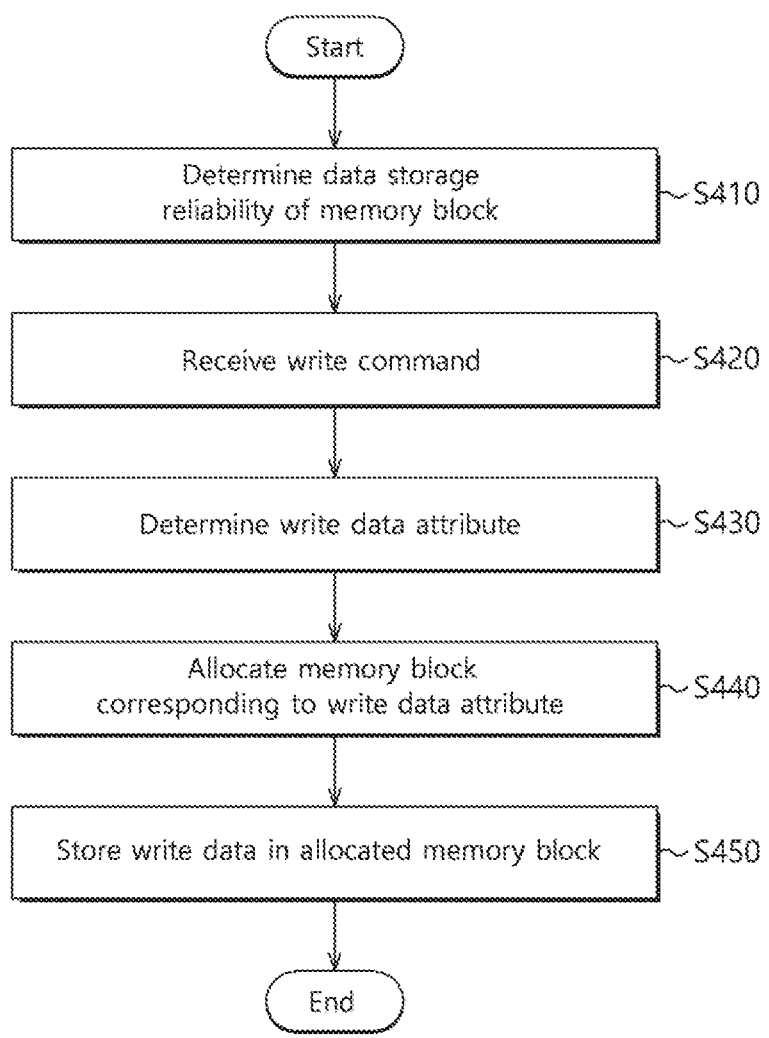
FIG. 4 is a flowchart describing an operation of a memory system in accordance with an embodiment of the present invention.

FIG. 4 is a flowchart describing an operation of the memory system 10 in accordance with an embodiment of the present invention.

Referring to FIG. 4, the memory system 10 may determine each of a plurality of memory blocks BK as any one of a normal block NBK, an available bad block BBK1 and an unavailable bad block BBK2, according to data storage reliability, in step S410. Specifically, the controller 200 may determine, as a normal block NBK, a memory block having data storage reliability equal to or greater than a second reference value RV2, among the plurality of memory blocks BK included in the nonvolatile memory device 100, and determine, as a bad block, a memory block having data storage reliability less than the second reference value RV2. Furthermore, the controller 200 may determine, as an available bad block BBK1, a memory block having data storage reliability equal to or greater than a first reference value RV1, among memory blocks determined as bad blocks, and determine, as an unavailable bad block BBK2, a memory block having data storage reliability less than the first reference value RV1.

In an embodiment, each of the first and second reference values RV1 and RV2 may indicate the number of write/erase operations on a corresponding memory block.

In step S420, the memory system 10 may receive a write command from the host 20. Specifically, the controller 200 may receive a write command and write data to be stored in the nonvolatile memory device 100 from the host 20.

In an embodiment, the nonvolatile memory device 100 may receive a write command and write data to be stored in the nonvolatile memory device 100.

In step S430, the memory system 10 may determine the attribute of the write data to be stored in the nonvolatile memory device 100. Specifically, the controller 200 may determine, as the first data, data which are necessarily required for the memory system 10 to normally operate. Furthermore, the controller 200 may determine, as the second data, write data other than the first data. The second data may include recovery data and/or a copy of the first data for recovering the first data when a loss or error occurs in the first data.

In step S440, the memory system 10 may allocate a memory block in which the write data is to be stored, among the plurality of memory blocks BK included in the nonvolatile memory device 100, according to the attribute of the write data. Specifically, the controller 200 may allocate a memory block determined as a normal block NBK to the write data determined as the first data. Furthermore, the controller 200 may allocate a memory block determined as an available bad block BBK1 to the write data determined as the second data.

In step S450, the memory system 10 may store the write data in the allocated memory block. Specifically, the controller 200 may control the nonvolatile memory device 100 to store the write data in the allocated memory block. The nonvolatile memory device 100 may perform a write operation of storing the write data in the allocated memory block under control of the controller 200.

Figure 5:
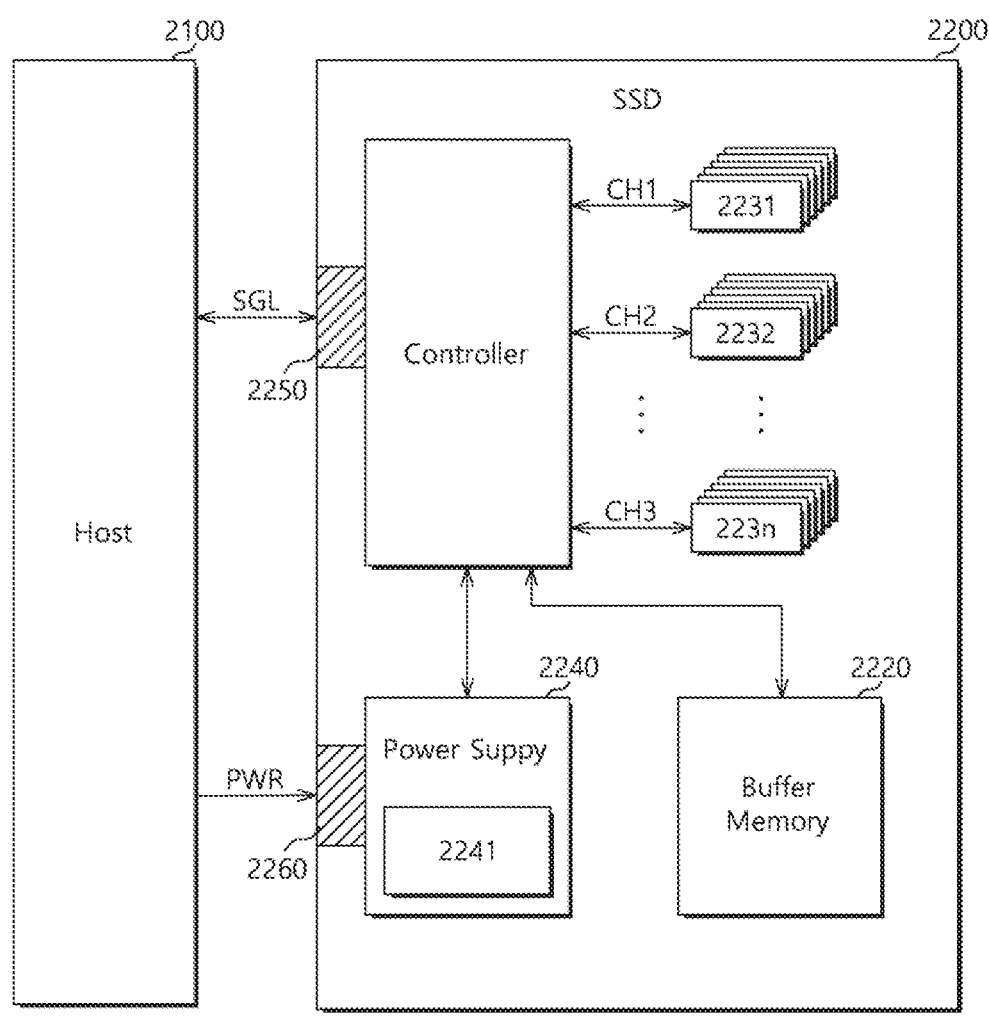
FIG. 5 is a diagram illustrating a data processing system including a solid state drive (SSD) in accordance with an embodiment of the present invention.

FIG. 5 is a diagram illustrating a data processing system 2000 including a solid state drive (SSD) 2200 in accordance with an embodiment of the present invention. Referring to FIG. 5, the data processing system 2000 may include a host 2100 and the SSD 2200.

The SSD 2200 may include a controller 2210, a buffer memory 2220, nonvolatile memory devices 2231 to 223n, a power supply 2240, a signal connector 2250 and a power connector 2260.

The controller 2210 may control overall operations of the SSD 2200.

The buffer memory 2220 may temporarily store data which are to be stored in the nonvolatile memory devices 2231 to 223n. Furthermore, the buffer memory 2220 may temporarily store data read from the nonvolatile memory devices 2231 to 223n. The data which are temporarily stored in the buffer memory 2220 may be transferred to the host 2100 or the nonvolatile memory devices 2231 to 223n under control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn, respectively. One or more nonvolatile memory devices may be coupled to one channel. The nonvolatile memory devices coupled to one channel may be coupled to the same signal bus and the same data bus.

The power supply 2240 may provide power PWR inputted through the power connector 2260 into the SSD 2200. The power supply 2240 may include an auxiliary power supply 2241. The auxiliary power supply 2241 may supply power to normally turn off the SSD 2200, when a sudden power off occurs. The auxiliary power supply 2241 may include large capacitors capable of storing power PWR.

The controller 2210 may exchange signals SGL with the host 2100 through the signal connector 2250. The signal SGL may include a command, address, data and the like. The signal connector 2250 may be configured as various types of connectors depending on an interface method between the host 2100 and the SSD 2200.

Figure 6:
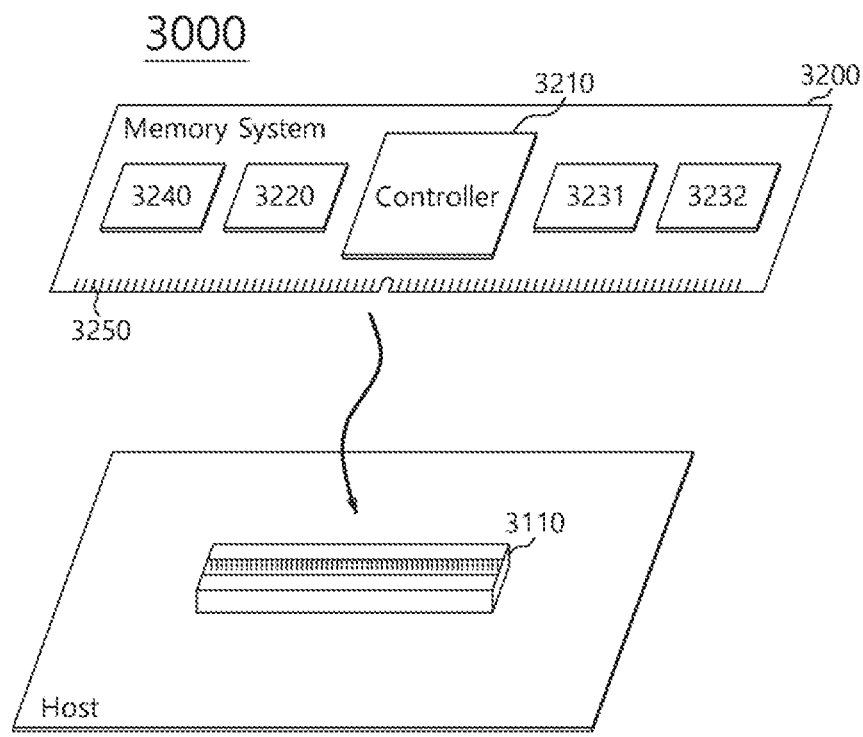
FIG. 6 is a diagram illustrating a data processing system including a memory system in accordance with an embodiment of the present invention.

FIG. 6 is a diagram illustrating a data processing system 3000 including a memory system 3200 in accordance with an embodiment of the present invention. Referring to FIG. 6, the data processing system 3000 may include a host 3100 and the memory system 3200.

The host 3100 may be configured in the form of a board such as a printed circuit board (PCB). Although not illustrated, the host 3100 may include internal function blocks for performing a function of the host.

The host 3100 may include a connection terminal 3110 such as a socket, slot or connector. The memory system 3200 may be mounted on the connection terminal 3110.

The memory system 3200 may be configured in the form of a board such as a PCB. The memory system 3200 may be referred to as a memory module or memory card. The memory system 3200 may include a controller 3210, a buffer memory 3220, nonvolatile memory devices 3231 and 3232, a power management integrated circuit (PMIC) 3240 and a connection terminal 3250.

The controller 3210 may control overall operations of the memory system 3200. The controller 3210 may be configured in the same manner as the controller 2210 illustrated in FIG. 5.

The buffer memory 3220 may temporarily store data which are to be stored in the nonvolatile memory devices 3231 and 3232. Furthermore, the buffer memory 3220 may temporarily store data read from the nonvolatile memory devices 3231 and 3232. The data which are temporarily stored in the buffer memory 3220 may be transferred to the host 3100 or the nonvolatile memory devices 3231 and 3232 under control of the controller 3210.

The nonvolatile memory devices 3231 and 3232 may be used as storage media of the memory system 3200.

The PMIC 3240 may provide power inputted through the connection terminal 3250 into the memory system 3200. The PMIC 3240 may manage the power of the memory system 3200 under control of the controller 3210.

The connection terminal 3250 may be coupled to the connection terminal 3110 of the host. Through the connection terminal 3250, signals and power may be transferred between the host 3100 and the memory system 3200, the signals including a command, address, data and the like. The connection terminal 3250 may be configured in various manners depending on an interface method between the host 3100 and the memory system 3200. The connection terminal 3250 may be disposed at any one side of the memory system 3200.

Figure 7:
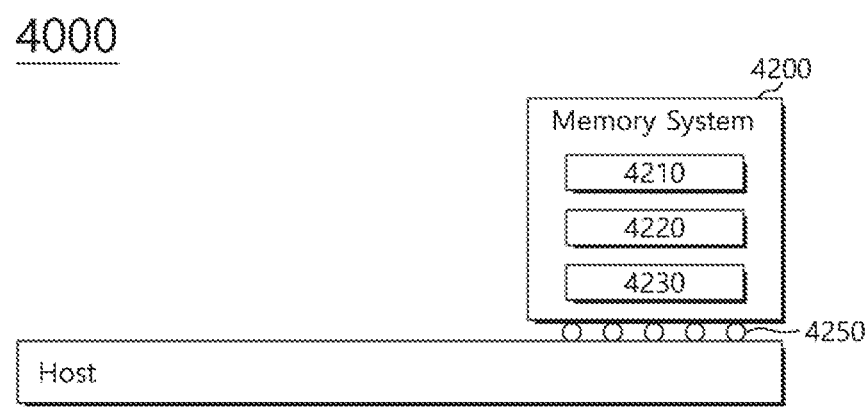
FIG. 7 is a diagram illustrating a data processing system including a memory system in accordance with an embodiment of the present invention.

FIG. 7 is a diagram illustrating a data processing system 4000 including a memory system 4300 in accordance with an embodiment of the present invention. Referring to FIG. 7, the data processing system 4000 may include a host 4100 and the memory system 4200.

The host 4100 may be configured in the form of a board such as a PCB. Although not illustrated, the host 4100 may include internal function blocks for performing a function of the host.

The memory system 4200 may be configured in the form of a surface mount package. The memory system 4200 may be mounted on the host 4100 through solder balls 4250. The memory system 4200 may include a controller 4230, a buffer memory 4220 and a nonvolatile memory device 4210.

The controller 4230 may control overall operations of the memory system 4200. The controller 4230 may be configured in the same manner as the controller 2210 illustrated in FIG. 5.

The buffer memory 4220 may temporarily store data which are to be stored in the nonvolatile memory device 4210. Furthermore, the buffer memory 4220 may temporarily store data read from the nonvolatile memory device 4210. The data which are temporarily stored in the buffer memory 4220 may be transferred to the host 4100 or the nonvolatile memory device 4210 under control of the controller 4230.

The nonvolatile memory device 4210 may be used as a storage medium of the memory system 4200.

Figure 8:
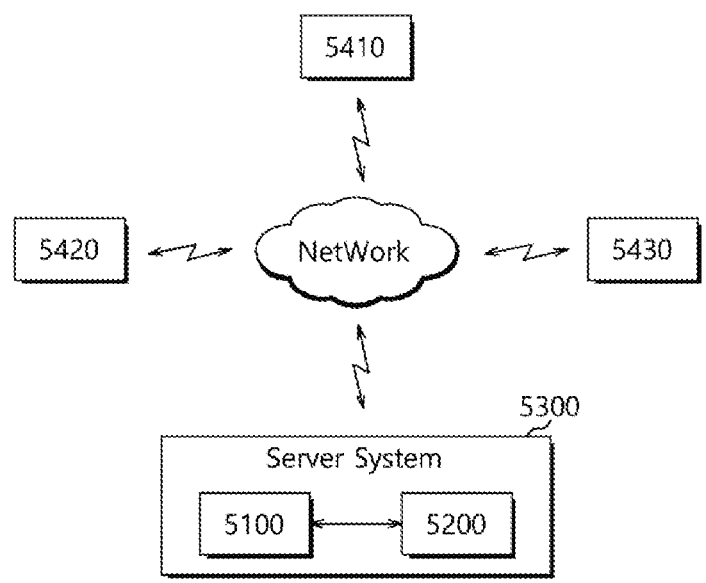
FIG. 8 is a diagram illustrating a network system including a memory system in accordance with an embodiment of the present invention.

FIG. 8 is a diagram illustrating a network system 5000 including a memory system 5200 in accordance with an embodiment of the present invention. Referring to FIG. 8, the network system 5000 may include a server system 5300 and a plurality of client systems 5410 to 5430 which are connected through a network 5500.

The server system 5300 may provide data in response to requests of the plurality of client systems 5410 to 5430. For example, the server system 5300 may store data provided from the plurality of client systems 5410 to 5430. For another example, the server system 5300 may provide data to the plurality of client systems 5410 to 5430.

The server system 5300 may include a host 5100 and the memory system 5200. The memory system 5200 may be configured as the memory system 10 of FIG. 1, the SSD 2200 of FIG. 5, the memory system 3200 of FIG. 6 or the memory system 4200 of FIG. 7.

In accordance with the present embodiments, it is possible to improve the data processing performance of the memory system.

While various embodiments have been described above, it will be understood to those skilled in the art that the embodiments described are examples only. Accordingly, the memory system and the operating method, which have been described herein, should not be limited based on the described embodiments.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a nonvolatile memory device comprising a plurality of memory blocks; and
   a controller configured to control the nonvolatile memory device,
   wherein the controller determines, as an available bad block, a memory block having data storage reliability equal to or greater than a first reference value and less than a second reference value, among bad blocks, determines, as an unavailable bad block, a memory block having data storage reliability less than the first reference value, among the bad blocks, determines write data to be stored in the nonvolatile memory device as first data which is required for the memory system to normally operate or second data which is other than the first data, and allocates the available bad block to the write data determined as the second data, and
   wherein the nonvolatile memory device performs a write operation of storing the second data in the available bad block.

2. The memory system according to claim 1, wherein the data storage reliability equal to or greater than the first reference value indicates that the number of write/erase operations is less than a first write/erase count.

3. The memory system according to claim 1, wherein the first data comprises at least one of user data and map data.

4. The memory system according to claim 1, wherein the second data is at least one of a copy of the first data and recovery data for recovering an error in the first data.

5. The memory system according to claim 1, wherein the controller determines, as the bad block, a memory block having data storage reliability less than the second reference value, among the plurality of memory blocks.

6. The memory system according to claim 5, wherein the data storage reliability less than the second reference value indicates that the number of write/erase operations is less than a second write/erase count.

7. The memory system according to claim 5, wherein the controller determines, as a normal block, a memory block having data storage reliability equal to or greater than the second reference value, among the plurality of memory blocks, and allocates the memory block determined as the normal block to the write data determined as the first data, and
   wherein the nonvolatile memory device performs a write operation of storing the write data determined as the first data in the allocated normal block.

8. An operating method of a memory system which includes a nonvolatile memory device including a plurality of memory blocks and a controller configured to control the nonvolatile memory device, the operating method comprising:
   determining, by the controller, as an available bad block, a memory block having data storage reliability equal to or greater than a first reference value and less than a second reference value, among bad blocks;

determining, by the controller, as an unavailable bad block, a memory block having data storage reliability less than the first reference value, among the bad blocks, determining, by the controller, write data to be stored in the nonvolatile memory device as any one of first data which is required for the memory system to normally operate and second data which is other than the first data;

allocating, by the controller, the available bad block to the write data determined as the second data; and performing, by the nonvolatile memory device, a write operation of storing the write data determined as the second data in the available bad block.

9. The operating method according to claim 8, wherein the data storage reliability equal to or greater than the first reference value indicates that the number of write/erase operations is less than a first write/erase count.

10. The operating method according to claim 8, wherein the first data comprises at least one of user data and map data.

11. The operating method according to claim 8, wherein the second data is at least one of a copy of the first data and recovery data for recovering an error of the first data.

12. The operating method according to claim 8, further comprising the step of determining, by the controller, as the bad block, a memory block having data storage reliability less than the second reference value, among the plurality of memory blocks.

13. The operating method according to claim 12, wherein the data storage reliability less than the second reference value indicates that the number of write/erase operations is less than a second write/erase count.

14. The operating method according to claim 12, wherein the controller determines, as a normal block, a memory block having data storage reliability equal to or greater than the second reference value, among the plurality of memory blocks, and allocates the memory block determined as the normal block to the write data determined as the first data, and wherein the nonvolatile memory device performs a write operation of storing the write data determined as the first data in the allocated normal block.

15. A memory system comprising:

a nonvolatile memory device having a plurality of memory blocks, configured to perform a write operation on the plurality of memory blocks; and a controller configured to determine each memory block as any one of a normal block, an available bad block and an unavailable bad block according to a write/erase count of a corresponding memory block, determine an attribute of write data to be stored in the nonvolatile memory device, and allocate the available bad block to the write data determined as copied data or recovery data when the write operation is performed, wherein the controller determines, the an available bad block, a memory block having data storage reliability equal to or greater than a first reference value and less than a second reference value, determines, as the unavailable bad block, a memory block having data storage reliability less than the first reference value, and determines, as the normal block, a memory block having data storage reliability equal to or greater than the second reference value.

* * * * *